Figure 1:
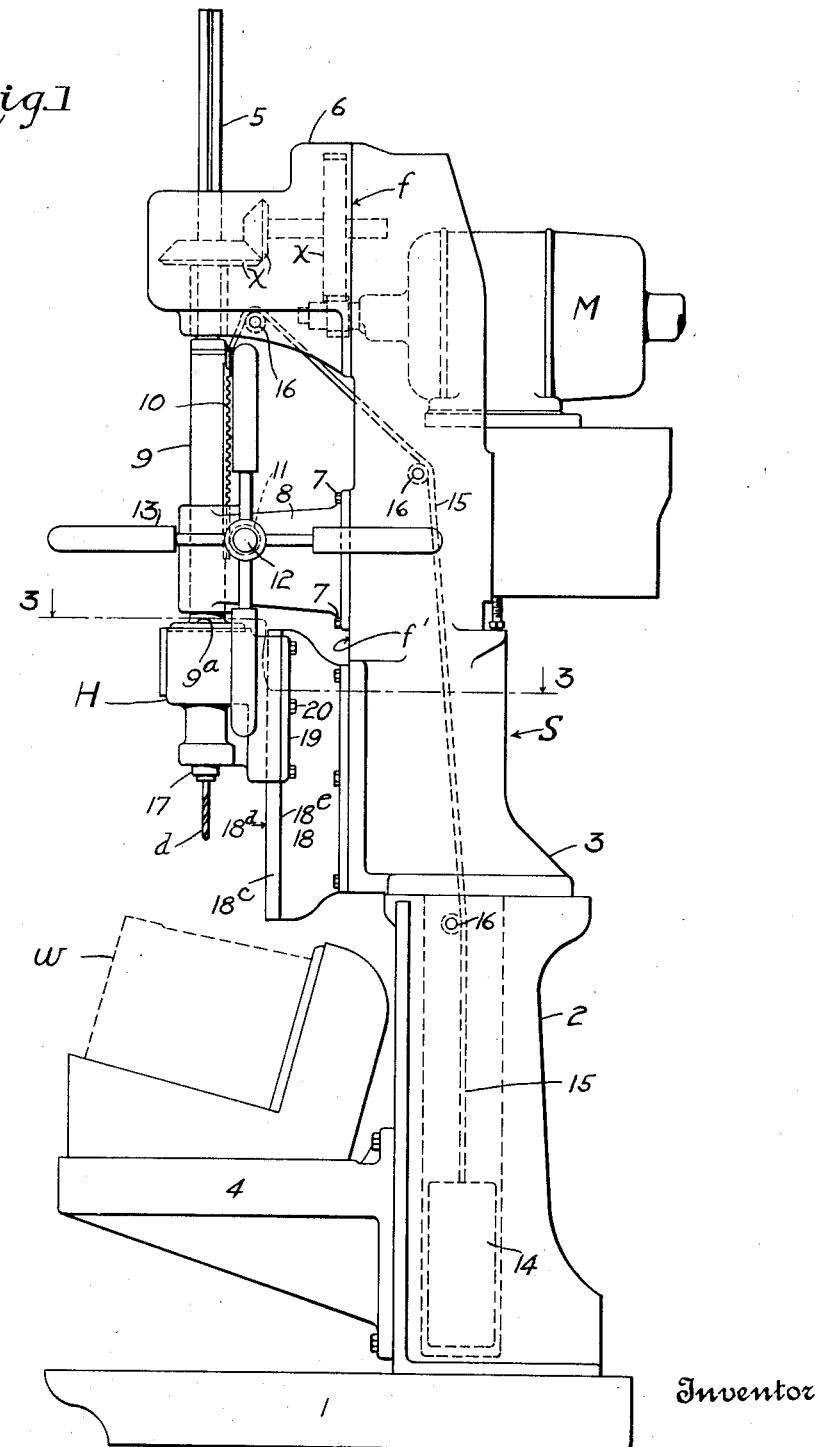

Patented Oct. 3, 1933

1,928,756

UNITED STATES PATENT OFFICE 1,928,756

SPINDLE GUIDE BRACKET

David C. Klausmeyer, deceased, late of Cincinnati, Ohio, by H. Henry Sundermann, executor, Cincinnati, Ohio, assignor to The Cincinnati Bickford Tool Company, Cincinnati, Ohio, a corporation of Ohio Application April 22, 1930. Serial No. 446,382

6 Claims. (Cl. 77—22)

This invention relates to an upright drilling and tapping machine of the single spindle type and it has for an object to render that type of machine tool more adaptable to multiple tool-heads.

Heretofore it has been common practice to clamp, or otherwise secure, to the lower end of a reciprocatory spindle sleeve of a single spindle machine a multiple tool-head, whereby a plurality of holes simultaneously may be drilled or tapped. Difficulty has been experienced in the use of multiple spindle tool-heads, due to the fact that action of the tools on the work tends to cause the tool-heads to weave and twist, thereby precluding the production of accurate work and, in some instances, in the breakage of tools. This deflection of the tool-head has been particularly pronounced when the spindle sleeve has been in its lowermost position, i. e. when the sleeve protrudes materially below the spindle feed bracket.

A primary object of this invention is to provide, in a machine of the type above referred to, means, other than the sleeve which supports the multiple tool-head, for rigidly holding the tool-head against all twisting and deflection and accurately to guide it in its movements toward and from the work-piece.

This object has been attained by the provision of an auxiliary guide bracket supported by the machine frame beneath the spindle feed bracket. The auxiliary bracket is formed with suitable bearing surfaces and guide surfaces to which the multiple tool-head is accurately fitted and upon which it is adapted to slide. This guide bracket affords a rigid support for the tool-head and relieves the spindle sleeve of all lateral strains incident to the machining operations, whereby the sleeve is required only to move the tool-head toward and from the work. It has been found that due to the additional rigidity gained by the use of the auxiliary guide bracket, a materially larger multiple spindle head may be used and the rate of penetration of the tools may be greatly increased.

Another object of the invention is to provide improved guide means between a stationary member and a member translatable thereon, whereby tendency of the translatable member to cant and bind will be obviated.

This latter object has been attained by providing in one of the members, a relatively narrow guide channel preferably arranged in line with the point at which power is applied to the translatable member to move it. The other member is formed with a relatively long and narrow guide rib fitted to the bearing walls of said guide channel. Preferably, but not necessarily, an adjustable tapered gib will be arranged between one wall of the guide channel and one side of the rib therein to compensate for wear in the parts.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
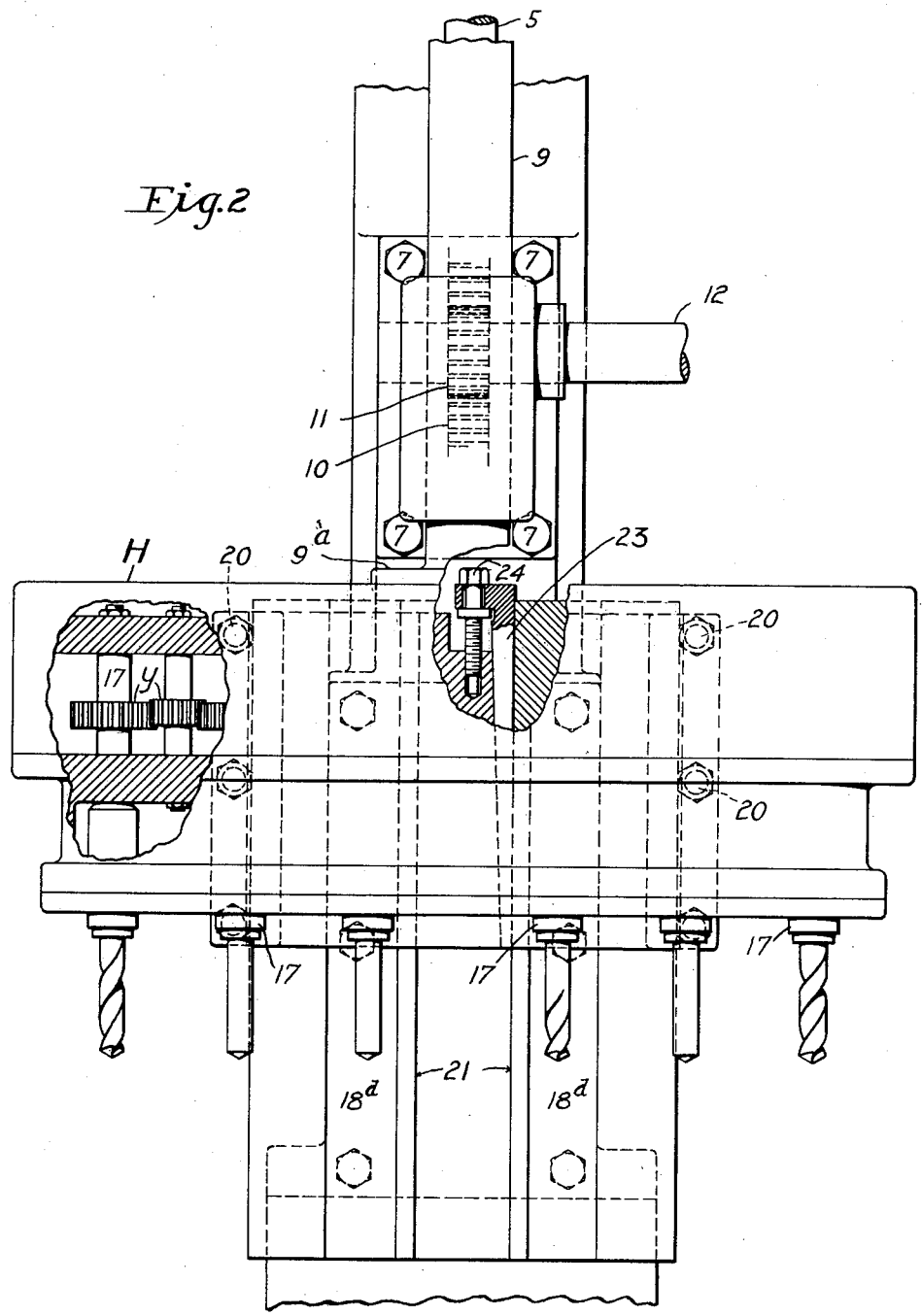
Figure 3:
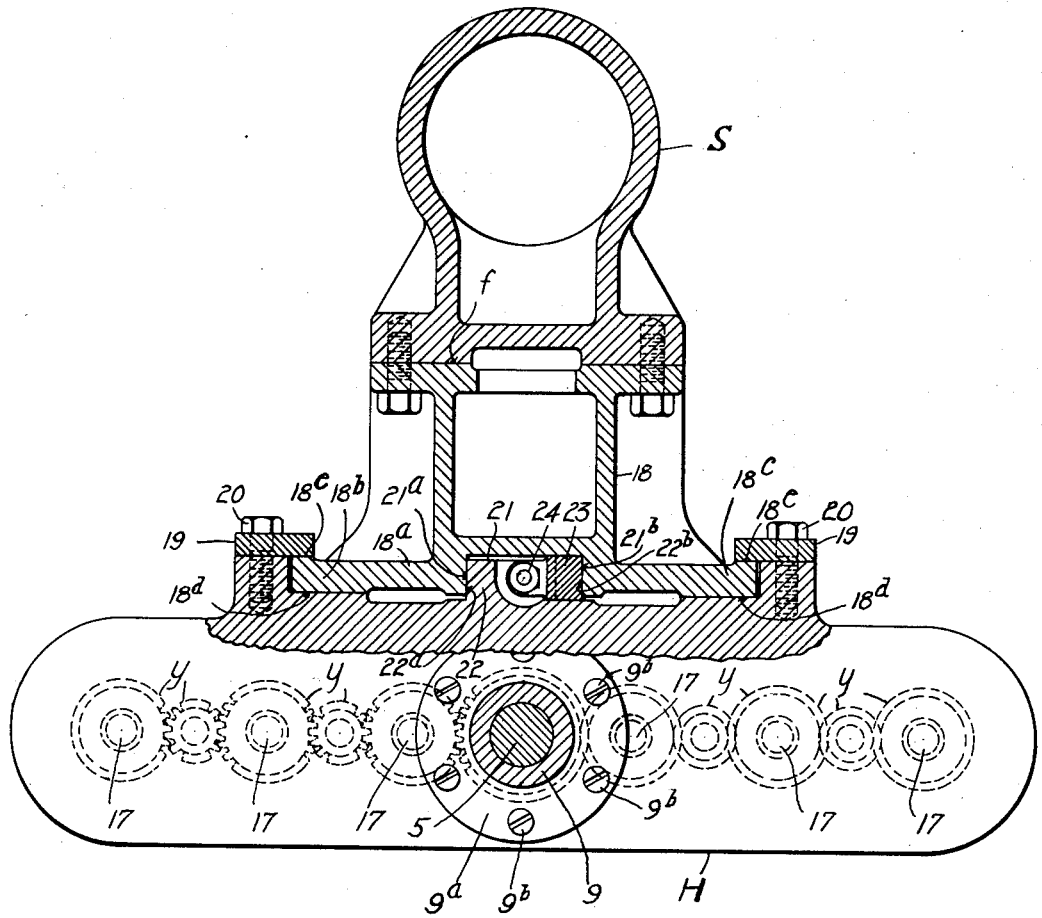

Figure 1 is a side elevation of an upright drilling machine embodying this invention. Fig. 2 is a front view, partly in section, of a portion thereof showing the multiple spindle tool-head mounted upon the auxiliary guide bracket. Fig. 3 is a section substantially on the line 3—3 of Fig. 1.

Referring more specifically to the drawings, the invention is disclosed as embodied in an upright drilling machine comprising a base 1 upon which is mounted an upright standard S preferably, but not necessarily, consisting of lower and upper frame elements 2 and 3. The lower frame element supports a suitable table 4 adapted to support a work-piece $w$. Adjacent its upper end, the standard carries a suitable driving motor M adapted to furnish power to rotate the usual driving spindle 5, later to be referred to.

The forward face of the standard is formed with upper and lower finished faces $f$ and $f'$ to the former of which is secured a spindle rotating head 6 which carries mechanism, designated generally as $x$, for transmitting rotary motion from the motor shaft to the spindle 5. To the upper portion of the face $f'$ is secured, as by bolts 7, a feed bracket 8 within which is translatably and non-rotatably fitted for vertical movement a spindle feed sleeve or quill 9. The spindle 5 is journaled in the sleeve 9 and projects from the lower end thereof for connection with a plurality of tool spindles, later to be referred to. To the end that the sleeve may be moved axially toward and from the work, a rack 10 is secured to the sleeve and that rack is engaged by a pinion 11 secured upon a shaft 12 journaled horizontally in the feed bracket 8. A pilot wheel 13 affords convenient means for rotating the shaft 12 to effect feeding movements of the sleeve. The weight of the sleeve 9 and parts carried thereby is preferably counterbalanced by means of a counter weight 14 arranged within the hollow frame section 2 and connected with the sleeve 9 by a flexible connector 15 passing over suitable pulleys 16.

The lower end of the sleeve 9 is formed with a flange 9a to which is secured, as for example by screw 9b, Fig. 3. A multiple tool-head H within which is journaled a plurality of tool spindles 17 each adapted to carry a suitable tool, as for example a drill d. The spindles 17 may be rotated from the spindle 5 by any suitable means as for example, the gear train y shown in Figs. 2 and 3.

In the drawings, the spindle rotating train x in the head 6 is shown as affording a uni-directional drive. It is to be understood, however, that, should circumstances require it, such for example as when the machine is to be used for tapping, the head 6 may be removed and replaced by a similar head having therein a reversing mechanism. Inasmuch as this interchange is common and well understood in the art, description and illustration thereof is deemed unnecessary.

The attachment of a multiple spindle head to a spindle sleeve, as above described, is not new but, as heretofore provided, the sleeve has been the sole means for supporting the tool-head and for holding it against deflection during the tooling operation.

An important feature of this invention resides in the provision of a supplemental support and guide for the multiple tool-head, whereby the sleeve is relieved of all strains tending to deflect or twist the tool-head. To that end there is secured to the standard, preferably but not necessarily, as by being bolted to the finished surface f', a guide bracket 18 of box-like construction, the forward wall 18a of which extends laterally affording oppositely extending ribs or flanges 18b and 18c each having a finished forward face 18d and a finished rearward face 18e. The faces 18d and 18e constitute bearing surfaces for the multiple tool-head H fitted thereto, as shown in Fig. 3, the faces 18d serving to prevent inward movement of any portion of the head while the faces 18e prevent outward movement thereof. For convenience of manufacture, straps 19 may be secured to the head H by bolts 20 and engage the rear bearing surfaces 18e. It will be observed that not only do the bearing surfaces 18d and 18e prevent inward and outward movement of the tool-head, but they also prevent angular movement thereof about a vertical axis.

Intermediate the flanges 18b and 18c, the wall 18a is formed with a relatively narrow vertically extending guide channel 21, the side walls 21a and 21b of which extend transverse to the bearing surfaces 18d and 18e and cooperate with the side walls 22a and 22b of a guide rib 22 fitted thereto. The guide channel 21 and the rib 22 cooperate to prevent lengthwise movement of the tool-head, i. e. movement in a direction parallel to the bearing surfaces 18d and they also serve to prevent angular movement of the head about a horizontal axis. Thus the tool-head is rigidly mounted on the guide bracket yet it is free to be moved vertically thereon.

To compensate for wear in the guide channel 21 and on the guide rib 22, the rib is preferably fitted with an adjustably mounted tapered gib 23 adapted to be moved vertically by the adjusting screw 24 as shown most clearly in Fig. 2.

Although the bearing and guide surfaces are shown and described as preferably being provided by the guide bracket 18, it is to be understood that, if desired, those surfaces may be provided by the machine column and the multiple tool-head extended to engage the same. Likewise the bearing and guide surfaces may be otherwise than as shown, for example the guide channel 21 may be formed in the head H and the cooperating guide rib 22 may be formed on the guide bracket 18.

Another important feature of this invention consists in so constructing, proportioning and arranging the guide channel and the cooperating guide rib that the translatable head will have a free and accurate sliding action and in which the tendency of the head to cant and bind will be materially less than in prior constructions. This has been accomplished by making the guide channel 21 relatively narrow and the rib 22 relatively long and by arranging them substantially midway between the edges of the wall 18a in line with the axis of the sleeve 9. As illustrated, the rib is substantially three times as long as it is wide, which, as readily will be perceived, will maintain the head in perfect alignment and facilitate translation thereof on the guide bracket.

From the foregoing, it will be perceived that this invention provides improved means for rigidly supporting on a single spindle machine tool a multiple tool-head in which the element which transmits the reciprocatory movements to the head is maintained strain free insofar as side thrusts and twisting strains are concerned.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, he claimed as new and desired to secure the following combinations and elements, or equivalents thereof, by Letters Patent of the United States:—

1. A machine tool combining a standard; a feed bracket projecting from said standard; a sleeve translatably and non-rotatably mounted in said bracket; a driving spindle rotatably journaled in said sleeve; a guide bracket fixed to said standard and having at its forward portion widely spaced and oppositely projecting guide flanges affording front and rear guide surfaces; a tool-head attached to one end of said translatable spindle and fitted against said front guide surfaces; straps rigidly secured to said tool-head and engaging said rear guide surfaces, said front and rear guide surfaces serving to prevent movement of said tool-head toward and from said standard and angular movement thereof about the axis of said sleeve; a tongue and groove connection between said guide bracket and said tool-head, intermediate said front guide surfaces, to guide the head in its reciprocating movements and to prevent movement of said head in a direction parallel to said front guide surfaces; a tool spindle rotatably journaled in said tool-head and connected to be rotated by said driving spindle; and means to reciprocate said sleeve and thereby said tool-head.

2. A drilling machine combining a standard; a feed bracket projecting from said standard; a spindle sleeve translatably and non-rotatably mounted in said bracket; a driving spindle rotatably journaled in said sleeve; spindle rotating means adjacent the upper end of said standard having a splined connection with said spindle; a guide bracket secured upon said standard beneath said feed bracket, said guide bracket being provided with oppositely extending vertically arranged flanges affording front and rear bearing surfaces and a vertically arranged guide channel in its forward face between said flanges; a multiple tool-head secured upon one end of said spindle sleeve and slidingly mounted upon said guide bracket and engaging said bearing surfaces to prevent movement of said tool-head toward and from said standard, said head also having a rearwardly projecting rib extending into said guide channel and engaging one wall thereof; an adjustable gib carried by said rib engaging the other side wall of said guide channel, the engagement of said rib and gib with the walls of said channel preventing lateral movement of said tool head; tool spindles journaled in said multiple tool-head and rotated from said driving spindle; and means to translate said sleeve, thereby to translate said tool-head on said guide bracket.

3. A machine tool combining an upright standard; a feed bracket secured to said standard; a translatable sleeve mounted in said feed bracket; a guide bracket secured to said standard, said guide bracket extending forwardly from said standard and having, at its forward portion, oppositely extending flanges each affording vertically disposed forward and rearward bearing surfaces; a multiple tool-head supported upon the lower end of said sleeve and slidingly engaging said forward and rearward bearing surfaces to prevent forward, rearward and turning movement of said tool-head; means to reciprocate said sleeve and thereby said tool-head; and additional closely spaced guide surfaces intermediate said flanges provided by said guide bracket transverse to the first mentioned surfaces and engaging a portion of said tool-head to prevent movement of said head in a plane parallel to the first mentioned surfaces.

4. A machine tool combining a standard; a bracket projecting from said standard; a member translatably mounted within said bracket; a guide bracket fixed to said standard and having at its forward portion oppositely projecting rectangular guide flanges each affording front and rear bearing surfaces; a tool-head slidingly mounted on said bearing surfaces and attached to one end of said member, said bearing surfaces serving to prevent movement of said tool-head toward and from said standard; means to reciprocate said member and thereby said tool-head; a relatively narrow guide channel formed in the forward face of said guide bracket intermediate said guide flanges, the bearing walls of said channel being transverse to said bearing surfaces; and a portion of said tool-head extending into said channel and engaging said bearing walls.

5. An upright machine tool combining a standard; a feed bracket projecting from said standard; a sleeve translatably mounted in said bracket; a guide bracket secured to said standard beneath said feed bracket, said guide bracket being formed with a front wall the marginal portions of which afford front and rear bearing surfaces and a vertically disposed relatively narrow guide channel substantially mid-way between said marginal portions; a multiple tool-head secured upon said sleeve and slidingly fitted to said guide bracket, said tool-head having portions engaging said front and rear bearing surfaces and a relatively long and narrow guide rib fitted to the side walls of said guide channel; and means to reciprocate said sleeve and thereby said tool-head on said guide bracket.

6. A drilling machine combining a standard; a feed bracket projecting from said standard; a spindle sleeve translatably and non-rotatably mounted in said bracket; a driving spindle rotatably journaled in said sleeve; spindle rotating means adjacent the upper end of said standard having a splined connection with said spindle; a guide bracket secured upon said standard beneath said feed bracket, said guide bracket being provided with oppositely extending flanges affording front and rear bearing surfaces; a multiple tool-head secured upon one end of said spindle sleeve and slidingly mounted upon said guide bracket and engaging said bearing surfaces to prevent inward, outward and rotary movement of said tool-head; a relatively narrow guide channel formed in one of the two last mentioned elements; a relatively long and narrow guide rib formed on the other of said elements and projecting into said guide channel and engaging one wall thereof; a tapered gib adjustably mounted on said guide rib and engaging the opposite wall of said guide channel; tool spindles journaled in said multiple tool-head and rotated from said driving spindle; and means to translate said sleeve, thereby to translate said tool-head on said guide bracket.

H. HENRY SUNDERMANN,
*Executor of the Last Will and Testament of David C. Klausmeyer, Deceased.*